United States Patent Office 3,336,367
Patented Aug. 15, 1967

3,336,367
N-ISOPROPYLCARBAMIC ACID-(2,2,2-TRIS CHLOROMETHYL)-ETHYL ESTER
August Amann and Wolfgang Jentzsch, Ludwigshafen (Rhine), and Gerald Neubauer, Frankenthal, Pfalz, Germany, assignors to Badische Anilin- & Soda-Fabrik Aktiengesellschaft, Ludwigshafen (Rhine), Germany
No Drawing. Filed Dec. 6, 1963, Ser. No. 328,455
1 Claim. (Cl. 260—482)

This application is a continuation-in-part of our co-pending application Ser. No. 174,720, filed Feb. 21, 1962, now abandoned. The invention relates to a new chlorine containing carbamic acid ester to the formula:

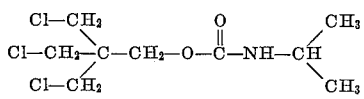

having sedative-hypnotic action.

The said new compound can be obtained by substituting the radical

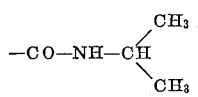

for the hydroxyl hydrogen in pentaerythritol trichlorohydrins of the formula:

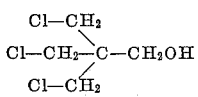

in conventional manner by reacting the said hydroxyl compound (a) with isopropyl carbamic acid halides,
(b) with phosgene and then with isopropylamine,
(c) with isopropyl urethanes,
(d) with haloformic acid esters and then with isopropylamine,
(e) with phosgene and an alcohol to form a mixed carbonic acid ester and then with isopropylamine, and
(f) with an isopropyl isocyanate.

Pentaerythritol trichlorohydrin (hereinafter referred to as "hydrin" for short) is obtainable from pentaerythritol in a simple manner by conventional methods.

The new compound can be obtained for example by dissolving the hydrin in an inert solvent and reacting the solution at elevated temperature, preferably in the presence of an equimolar amount of an auxiliary base, with a stoichiometric amount of the carbamic acid chloride, or by reacting the hydrin first with phosgene or a chloroformic acid ester and then with isopropyl amine. The salt of the auxiliary base formed by these reactions is separated. The remaining solution is washed with water and then worked up in conventional manner. By an alternative method, hydrin and phosgene may be reacted in the presence of a lower alcohol. In this way a carbonic acid ester is obtained which, after separation of the salt, is allowed to react with isopropyl amine at moderately elevated temperature. When using phosgene it is recommendable to blow out the unreacted phosgene from the solution with air or with oxygen prior to working up the reaction mixture.

When hydrin and a urethane are used as starting materials for the production of the carbamic acid ester, the hydrin, for example, may be boiled with from five to ten times its amount of urethane. When the reaction is complete, i.e. when alcohol is no longer split off, the reaction mixture is introduced into water, and the organic phase is extracted with ether and worked up in conventional manner.

When using isopropyl isocyanate for the reaction, equimolar amounts of the hydrin and the isocyanate are allowed to react with each other, for example in boiling benzene solution, with the addition of a catalytic amount of a base, such as sodium methylate or pyridine. The reaction mixture, from which the carbamic acid ester usually begins to separate during the reaction, is worked up in conventional manner.

Of the above-defined methods for the preparation of the compound that starting from hydrin, isopropyl amine and phosgene is the most advantageous technically and the most widely applicable.

The new compound not only has outstanding sedative-hypnotic properties which are superior to those of substances having similar therapeutic properties, but also improved compatibility, as is shown by experiments on mice in which the median lethal, hypnotic and sedative does and the doses for electroconvulsive and veratramine-convulsive protection have been determined.

The following compounds were tested for their pharmacological properties:

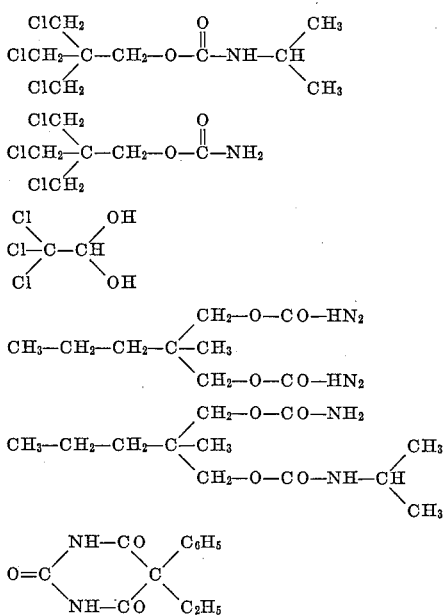

The experiments were carried out on mice and the results are listed in the table below in which the abbreviations used have the following meanings:

$LD_{50}$: median lethal dose; period of observation 48 hours upon intraperitoneal administration and 72 hours upon peroral administration.

$HD_{50}$: median hypnotic dose. This is the dose upon the administration of which the animals no longer rise upon light pressure on their tails after they have adopted a side position.

$SD_{50}$: median sedative dose. This is the dose after the administration of which the animals fall off a slowly rotating drum (6 r.p.m.) of fine-meshed wire netting which is inclined and open at the bottom.

$ED_{50}$: median protecting dose protecting the animals from electrically induced tonic-clonic extensor convulsions of the hind extremities (eye electrodes; 25 ma.; 0.2 second; 50 cycles).

$VD_{50}$: median protective dose protecting the animals from tonic-clonic extensor convulsions of the hind extremities induced by veratramine.

i.p.: intraperitoneal administration
p.o.: peroral administration $LD_{50}/HD_{50}$, $SD_{50}$, etc.: ratio of median lethal dose to median effective dose $HD_{50}$, $SD_{50}$, etc. as a measure of the pharmacological activity of the compound in relation to its compatibility (therapeutic effect)

—: not measured into 64.9 parts of isopropylamine dissolved in 400 parts of dry benzene, while stirring at room temperature. After stirring for three hours, the solution is filtered, washed with water and evaporated. The residue is recrystallized from petroleum ether. The yield is 128 parts (84% of the theory) of N-iso-propylcarbamic acid-(2,2,2-tris-chloromethyl)-ethyl ester in the form of white crystals having the melting point 80° to 81° C.

The chloroformic acid ester may be prepared as follows: 536 parts of pentaerythritol trichlorohydrin dissolved in 1000 parts of dry toluene is dripped while stirring at —15° C. into 300 parts of phosgene dissolved in 400 parts of dry toluene and then 518 parts of tributylamine dissolved in 800 parts of dry toluene is dripped in at —5° C. while stirring. The cooling bath is then removed, the whole stirred for twenty-six hours at room temperature and the excess phosgene finally blown out with nitrogen. The reaction solution is washed twice with a mixture of ice and 2 N hydrochloric acid and once with ice-water, dried and concentrated. Vacuum distillation of the residue gives 582 parts (82%) of chloroformic acid (2,2,2-trischloromethyl)-ethyl ester having the boiling point 92° to 95° C. at 0.2 mm. Hg.

We claim:
The compound of the formula

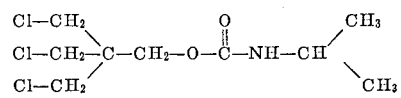

| Compound | Median doses in mg./kg. body weight | | | | | | | Therapeutic effect | | | | |
|---|---|---|---|---|---|---|---|---|---|---|---|---|
| | $LD_{50}$ | | $HD_{50}$ | $SD_{50}$ | | $ED_{50}$ | $VD_{50}$ | $LD_{50}/HD_{50}$ | $LD_{50}/SD_{50}$ | | $LD_{50}/ED_{40}$ | $LD_{50}/VD_{50}$ |
| | i.p. | p.o. | i.p. | i.p. | p.o. | i.p. | i.p. | i.p. | i.p. | p.o | i.p. | i.p. |
| (1) N-iso-propylcarbamic acid-(2,2,2-trischloromethyl)-ethyl ester | 595 | 1,310 | 65 | 53 | 146 | 73 | 17 | 9.1 | 11.2 | 9.0 | 8.2 | 34.2 |
| (2) Carbamic acid-(2,2,2-trischloromethyl)-ethyl ester | 488 | 950 | 61 | 62 | 146 | 77 | 78 | 8.0 | 7.9 | 6.5 | 6.3 | 6.3 |
| (3) Chloral hydrate | 576 | 1,094 | 267 | 205 | 223 | 210 | 88 | 2.2 | 2.8 | 4.9 | 2.2 | 6.5 |
| (4) Meprobromate | 660 | 1,000 | ------ | 185 | 185 | 105 | 445 | ------ | 8.6 | 5.4 | 6.4 | 1.5 |
| (5) Carisoprodol | 940 | 2,000 | 124 | 63 | 305 | ------ | 69 | 7.6 | 14.9 | 6.5 | ------ | 13.7 |
| (6) Phenobarbital | 176 | ------ | ------ | ------ | ------ | ------ | 163 | ------ | ------ | ------ | ------ | 1.1 |

The table shows that
(a) compound (1) has the best hypnotic therapeutic effect $LD_{50}/HD_{50}$. This effect is 10% above the next best value (2) and four times superior to that of chloral hydrate;
(b) compound (1) is superior to comparable compounds in its sedative therapeutic effect $LD_{50}/SD_{50}$. Only compound (5) gives better results in the case of i.p. administration, not however upon p.o. administration;
(c) in the case of $LD_{50}/ED_{50}$ compound (1) gives the best therapeutic effect;
(d) compound (1) gives by far the best therapeutic effect in the case of $LD_{50}/VD_{50}$.

In the following example the parts and percentages are by weight.

Example 140 parts of chloroformic acid-(2,2,2-tris-chloromethyl) ethyl ester dissolved in 100 parts of dry benzene is dripped

References Cited

UNITED STATES PATENTS
2,967,880  1/1961  Finke _____ 260—482
3,081,341  3/1963  Mooradian _____ 260—482

FOREIGN PATENTS
1,214,891  11/1959  France.
850,003  9/1960  Great Britain.

OTHER REFERENCES
Whitehead: Cancer Research, vol. 14, pp. 418–422 (1954).

LORRAINE A. WEINBERGER, *Primary Examiner.*

LEON ZITVER, *Examiner.*

D. CLARKE, A. P. HALLUIN, *Assistant Examiners.*

UNITED STATES PATENT OFFICE
CERTIFICATE OF CORRECTION

Patent No. 3,336,367                      August 15, 1967

August Amann et al.

It is hereby certified that error appears in the above numbered patent requiring correction and that the said Letters Patent should read as corrected below.

In the heading to the printed specification, after line 8, insert -- Claims priority, application Germany, B 61,399, Feb. 23, 1961 --.

Signed and sealed this 21st day of January 1969.

(SEAL)
Attest:

Edward M. Fletcher, Jr.                     EDWARD J. BRENNER
Attesting Officer                        Commissioner of Patents